(12) United States Patent
Tetreault et al.

(10) Patent No.: US 11,083,071 B2
(45) Date of Patent: Aug. 3, 2021

(54) METHOD FOR MONITORING POWER CONSUMPTION OF A LOAD COUPLED TO A POWER SWITCH

(71) Applicant: Hubbell Incorporated, Shelton, CT (US)

(72) Inventors: Michael Dennis Tetreault, Simsbury, CT (US); Nicholas Charles Kraus, Enfield, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/599,186

(22) Filed: Oct. 11, 2019

(65) Prior Publication Data

US 2020/0137847 A1    Apr. 30, 2020

Related U.S. Application Data

(60) Provisional application No. 62/749,722, filed on Oct. 24, 2018.

(51) Int. Cl.
*H05B 47/175* (2020.01)
*H05B 45/10* (2020.01)

(52) U.S. Cl.
CPC .......... *H05B 47/175* (2020.01); *H05B 45/10* (2020.01)

(58) Field of Classification Search
CPC ...... H05B 47/155; H05B 47/19; H05B 45/10; H05B 47/105; H05B 47/11; H05B 33/08;

(Continued)

(56) References Cited

U.S. PATENT DOCUMENTS 8,461,503 B2   6/2013  Leinen
8,890,418 B2   11/2014 Mohan et al.
(Continued)

FOREIGN PATENT DOCUMENTS

JP       2016-73003       5/2016
WO    WO 2016/073272    5/2016

OTHER PUBLICATIONS

PCT International Search Report and Written Opinion for corresponding PCT Application No. PCT/US19/55781, dated Jan. 6, 2020, 9 pages.

(Continued)

*Primary Examiner* — Monica C King
(74) *Attorney, Agent, or Firm* — Michael Best & Friedrich LLP (57) ABSTRACT

A power switch configured to control power delivery to a load is provided. The power switch can include a switching element configured to selectively couple the load to a power source. The power switch can include a power metering circuit. The power switch can include a communication circuit configured to provide communication between the power switch and at least one other device. The power switch can include a control device. The control device can obtain data from the power metering circuit. The data can be indicative of power consumption by the load. The control device can determine whether the power consumption exceeds a threshold associated with a power rating for the power switch for a time greater than a threshold period. The control device can perform one or more control actions when the power consumption exceeds the threshold for greater than the threshold period.

20 Claims, 7 Drawing Sheets

(58) Field of Classification Search
CPC ........ H05B 45/20; H05B 47/10; H05B 47/12;
H05B 47/175; H05B 47/16
See application file for complete search history.

(56) References Cited

U.S. PATENT DOCUMENTS

| | | |
|---|---|---|
| 9,713,231 B2 | 7/2017 | Kelly et al. |
| 2007/0285027 A1 | 12/2007 | Gehman |
| 2010/0259931 A1* | 10/2010 | Chemel .................. F21V 29/85 |
| | | 362/249.02 |
| 2011/0080046 A1 | 4/2011 | Lee et al. |
| 2013/0038234 A1 | 2/2013 | Van Der Veen et al. |
| 2014/0103823 A1 | 4/2014 | Kahlman et al. |
| 2014/0253483 A1 | 9/2014 | Kupersztoch et al. |
| 2015/0005900 A1 | 1/2015 | Steele et al. |
| 2015/0012151 A1 | 1/2015 | Park |
| 2017/0234562 A1 | 8/2017 | Ribbich et al. |
| 2018/0173416 A1 | 6/2018 | Baldwin et al. |
| 2018/0213621 A1* | 7/2018 | Freer ..................... H05B 45/37 |

OTHER PUBLICATIONS

Biery et al, "Controlling LEDs," Technical white paper, Lutron Electronics Co., Inc., May 2014—20 pages.

\* cited by examiner

METHOD FOR MONITORING POWER CONSUMPTION OF A LOAD COUPLED TO A POWER SWITCH

PRIORITY CLAIM

The present application claims the benefit of priority of U.S. Provisional App. No. 62/749,722, titled "Method for Monitoring Power Consumption of a Load Coupled to a Power Switch," having a filing date of Oct. 24, 2018, which is incorporated by reference herein.

FIELD

The present disclosure relates generally to power switches configured to control power delivery to a load.

BACKGROUND

In-wall devices can include devices that can be mounted on or at least partially disposed in a wall or other surface (e.g., in a wall mounted electrical box). Example in-wall devices can include power switches used to control various powered devices, such as electronics, light sources, appliances, power outlets, and other devices. Power switches can control power delivered to a load, for instance, by interrupting a conductor delivering power to a load. Example power switches can include, for instance, single or multiple on/off toggle switches, paddle or rocker switches, single or multiple pole dimmer switches, power outlets, etc.

With the advance of Internet of Things (IoT) technology, power switches and other in-wall devices can communicate with other electronic devices over one or more communication links. For instance, power switches can be capable of communicating using communication technologies, such as Bluetooth low energy, Bluetooth mesh networking, near-field communication, Wi-Fi, Zigbee, Ethernet, etc.

SUMMARY

Aspects and advantages of embodiments of the present disclosure will be set forth in part in the following description, or may be learned from the description, or may be learned through practice of the embodiments.

One example aspect of the present disclosure is directed to a power switch configured to control power delivery to a load. The power switch can include one or more switching elements configured to selectively couple the load to a power source. The power switch can include a power metering circuit. The power switch can include a communication circuit configured to provide communication between the power switch and at least one other device. The power switch can include one or more control devices. The one or more control devices can be configured to obtain data from the power metering circuit. The data can be indicative of power consumption by the load. The one or more control devices can be further configured to determine whether the power consumption exceeds a threshold associated with a power rating for the power switch for a time greater than a threshold period. When the one or more control devices determine the power consumption exceeds the threshold for a time greater than threshold period, the one or more control devices can be further configured to perform one or more control actions associated with controlling power delivery to the load.

Another example aspect of the present disclosure is directed to a method for controlling power delivery to a load via a power switch. The method includes obtaining, by one or more control devices of the power switch, data indicative of power consumption of the load. The method further includes determining, by the one or more control devices, whether power consumption by the load exceeds a threshold associated with a power rating for the power switch for a time greater than a threshold period. Furthermore, in response to determining power consumption by the load exceeds the power rating, the method further includes performing, by the one or more control devices, one or more control actions associated with controlling power delivery to the load.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a power switch configured to control and/or power one or more electrical loads. For instance, the power switch can be configured to control power delivery to one or more electrical loads. In this manner, the power switch can be configured to interrupt electrical power delivery to the one or more electrical loads.

In some implementations, the power switch can be coupled between a power source (e.g., mains power source) and the one or more electrical loads. In this manner, the power switch can be configured to selectively couple the one or more electrical loads to the power source based on commands (e.g., user input) received at the power switch. Alternatively or additionally, the power switch can be configured to selectively couple the one or more electrical loads to the power source based, at least in part, on commands received at a remote device (e.g., another power switch, user device, etc.) and provided over a network to the power switch. In this manner, power delivery to the one or more electrical loads can be controlled from more than one location.

In some implementations, the power switch can include a power metering circuit. The power metering circuit can be coupled to one or more conductors (e.g., wires) coupling the power switch to the one or more electrical loads. The power metering circuit can include one or more sensors (e.g., voltage sensors and/or current sensors) configured to detect (e.g., measure) power consumption of the load.

In some implementations, the power switch can include one or more control devices configured to obtain data from the power metering circuit. The data can, as discussed above, be indicative of power consumption of the one or more electrical loads. The one or more control devices can be further configured to determine based, at least in part, on the data whether the power consumption of the one or more electrical loads exceeds (e.g., is greater than) a threshold associated with a power rating for the power switch for a time greater than a threshold period. In this manner, the one or more control devices can be configured to ignore transient spikes in power consumption of the one or more electrical loads that exceed the threshold for a time less than the threshold period.

In some implementations, the threshold can include a plurality of thresholds. For instance, the plurality of thresholds can include a first threshold, a second threshold, a third threshold, and a fourth threshold. It should be appreciated, however, that the plurality of threshold can include more or fewer thresholds. The first threshold can correspond to about 80 percent of the power rating. The second threshold can correspond to about 90 percent of the power rating. The third threshold can correspond to about 100 percent of the power rating. The fourth threshold corresponding to about 110 percent of the power rating.

In some implementations, the threshold period can include a plurality of threshold periods. For instance, the plurality of threshold periods can include a first threshold period, a second threshold period, a third threshold period, and a fourth threshold period. It should be appreciated, however, that the plurality of threshold periods can include more or fewer threshold periods. The first threshold period can be associated with the first threshold. The second threshold period can be associated with the second threshold. The third threshold period can be associated with the third threshold. The fourth threshold period can be associated with the fourth threshold.

In some implementations, a duration of each threshold period (e.g., first, second, third, fourth, etc.) can differ based, at least in part, on the corresponding threshold. For instance, a duration of the second threshold period can be shorter than a duration of the first threshold period. In addition, a duration of the third threshold period can be shorter than the duration of the first threshold period and the duration of the second threshold period. Still further, a duration of the fourth threshold period can be shorter than the duration of the first threshold period, the duration of the second threshold period, and the duration of the third threshold period. As will be discussed below in more detail, the one or more control devices can be configured to perform one or more control actions associated with controlling power delivery to the one or more electrical loads when power consumption of the one or more electrical loads exceeds a threshold associated with the power rating for the power switch for a time greater than a threshold period.

In some implementations, the power switch can be configured to control power delivery to a light source of a lighting fixture. When the one or more control devices determine power consumption of the light source exceeds the threshold associated with the power rating for the power switch for a time greater than the threshold period, the one or more control devices can dim the light source. For example, the one or more control devices can provide a control signal to a dimmer circuit of the power switch. The dimmer circuit can be configured to provide a dimming control signal to a dimmable driver circuit of the lighting fixture based, at least in part, on the control signal. The dimmable driver circuit can be configured to adjust a driver output provided to the light source based, at least in part, on the dimming signal. More specifically, the driver circuit can adjust the driver output to facilitate dimming of the light source. In this manner, power consumption of the lighting fixture can be reduced. More specifically, the light source can be dimmed such that power consumption of the lighting fixture is reduced to a level that is less than the threshold associated with power rating for the power switch.

In some implementations, the power switch can be configured to control power delivery to a non-dimmable light source of a lighting fixture. For instance, the non-dimmable light source can be a light source that is not coupled to a dimmer circuit or is otherwise not capable of dimming. When power consumption of the non-dimmable light source exceeds a threshold associated with a power rating for the power switch for a timer greater than a threshold period, the one or more control actions can include controlling operation of one or more switching elements of the power switch to decouple the light source from the power source. In this manner, the non-dimmable power source can no longer receive electrical power from the power source.

In some implementations, the one or more control devices can provide a notification indicative of power consumption of the one or more electrical loads exceeding a threshold associated with the power rating for the power switch for an amount of time greater than a threshold period. For instance, the notification can include an audible notification provided via one or more speakers of the power switch. Alternatively or additionally, the notification can include a visual notification provided via one or more indicator lights of the power switch. In some implementations, the notification can be provided over a network to one or more user devices (e.g., smartphone, tablet, laptop, etc.). For instance, the notification can include a text, email, automated phone call, or any other suitable notification.

The power switch of the present disclosure provides numerous technical benefits. For instance, the power switch can monitor power consumption of the one or more electrical loads and control power delivery to the one or more electrical loads when the power consumption exceeds the threshold associated with the power rating for the power switch for an amount of time greater than a threshold period. In this manner, the power switch can regulate power consumption of the load.

As used herein the use of the term "about" in conjunction with a numerical value is intended to refer to within 20% of the stated amount. Also, use of the term "obtaining" or "obtain" can include receiving, determining, calculating, accessing, reading or otherwise obtaining data.

Figure 1:
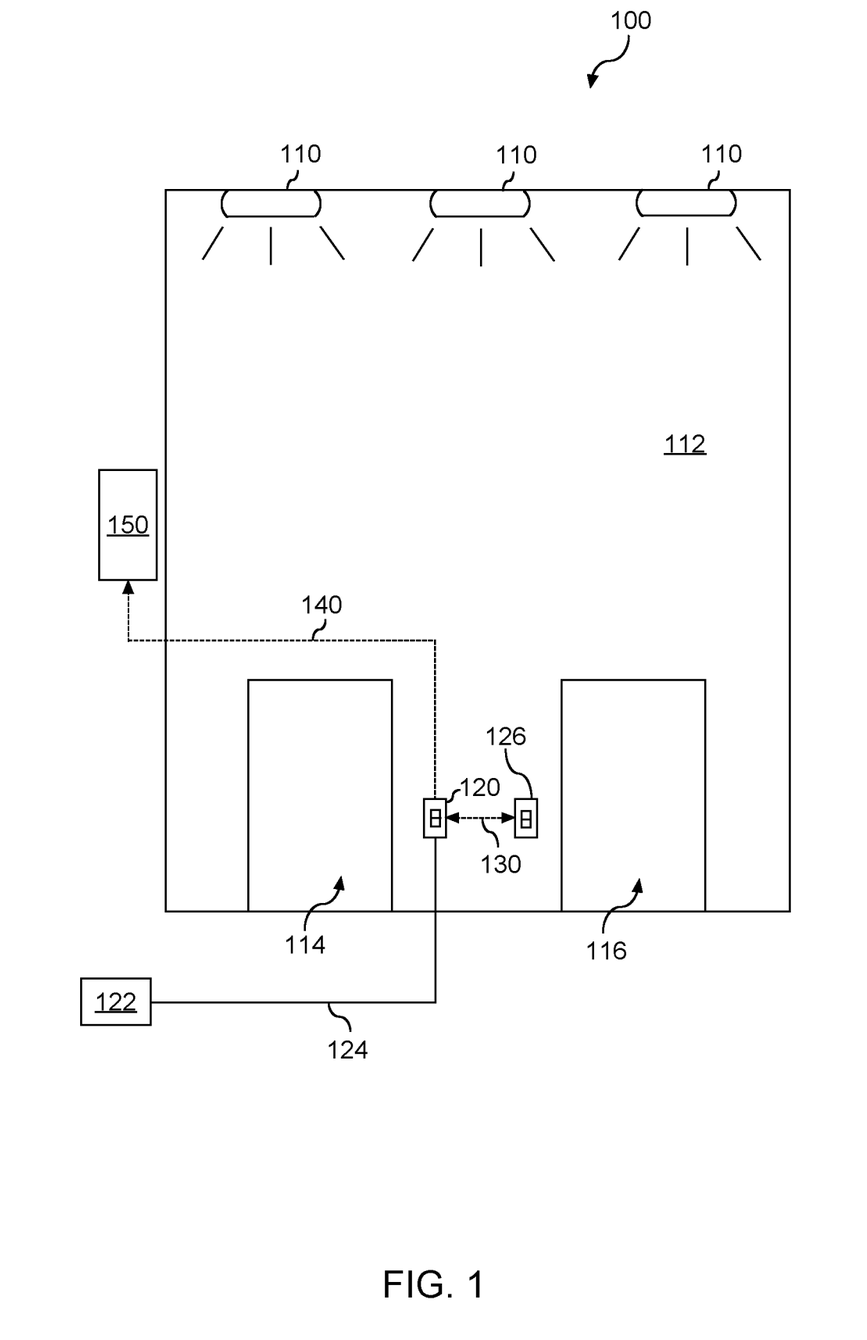
FIG. 1 depicts a schematic of a lighting system according to example embodiments of the present disclosure.

Referring now to the Figures, FIG. 1 depicts a lighting system 100 incorporating a power switch according to example embodiments of the present disclosure. The lighting system 100 includes one or more lighting fixtures 110 (e.g., luminaires) operable to provide illumination for a space 112 (e.g., a room). The lighting system 100 can include a power switch 120. The power switch 120 can be arranged near an entrance 114 into the space 112. It should be appreciated, however, that the power switch 120 can be arranged at any suitable location within the space 112.

In some implementations the power switch 120 can be coupled to an electrical panel 122 including one or more circuit breakers. More specifically, the power switch 120 can be coupled to the electrical panel 122 via one or more conductors 124. In some implementations, the electrical panel 122 can be coupled to a power source (e.g., AC mains). In this manner, electrical power can be provided from the power source to the power switch 120 via the electrical panel 122. In some implementations, the power switch 120 can be configured to control power delivery to the one or more lighting fixtures 110 (or other powered loads) to control lighting with the space 112. It should be appreciated, however, that the power switch 120 can be configured to control power delivery to any suitable load. For instance, in some implementations, the power switch 120 can be configured to control power delivery to one or more ceiling fans in the space 112.

In some implementations, the power switch 120 can be a master power switch in a multiway switch system that includes at least one other power switch configured as a slave power switch 126. As shown, the slave power switch 126 can be arranged near entrance 116 into space 112. In some implementations, the slave power switch 126 can be in communication with the master power switch (e.g., power switch 120) over a first communication link 130 (e.g., Bluetooth Low Energy communication link or other suitable communication link). User interaction with the slave power switch 126 can cause data to be communicated to the master power switch (e.g., power switch 120) over the first communication link 130 to control power delivery to the one or more lighting fixtures 110.

In some implementations, the power switch 120 can be further configured to communicate with other devices 150 (e.g., user devices, cloud computing systems, servers, etc. over a second communication link 140 via one or more networks. In this manner, a user can interact remotely with the slave power switch 126 by communicating with the master power switch (e.g., power switch 120), which then relays data and other information over the first communication link 130 to the slave power switch 126.

Figure 2:
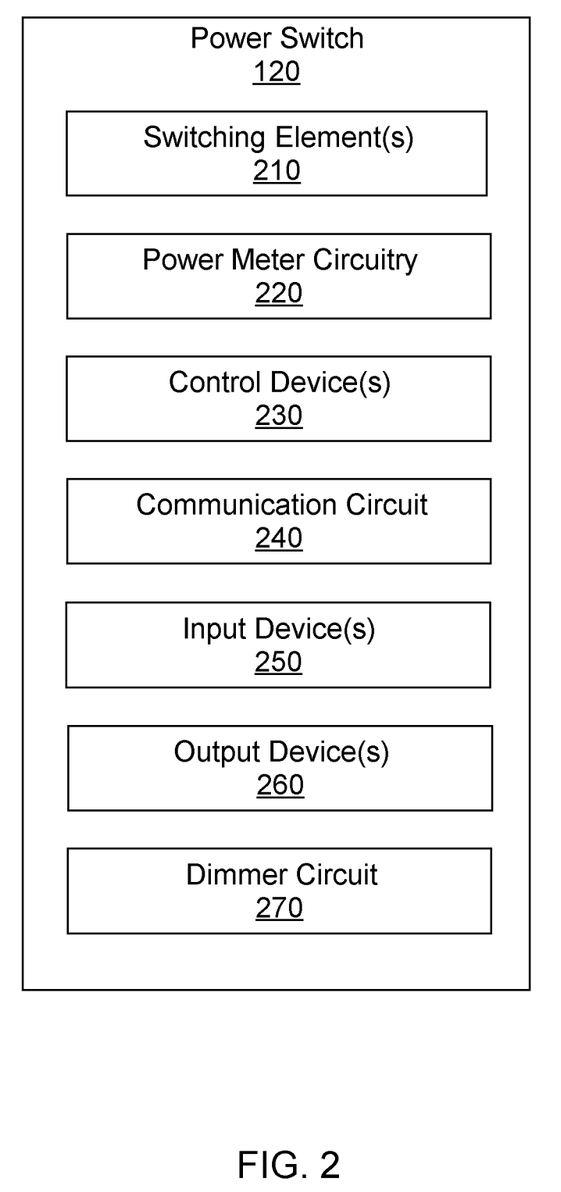
FIG. 2 depicts a block diagram of a power switch of the lighting system according to example embodiments of the present disclosure.

FIG. 2 illustrates suitable components of the power switch 120 according to example embodiments of the present disclosure. As shown, the power switch 120 can include one or more switching elements 210 configured to selectively couple a load (e.g., luminaires) to a power source (e.g., AC mains). In some implementations, the one or more switching elements 210 can transition between a first state and a second state. When the one or more switching elements 210 are in the first state, power is delivered from the power supply to the load. In contrast, power is not delivered from the power source to the load when the one or more switching elements are in the second state. It should be appreciated that the one or more switching elements 210 can include any suitable device configured to control power delivery to the load. For instance, in some implementations, the one or more switching elements 210 can include one or more contactors. Alternatively, the one or more switching element 210 can include one or more transistors, one or more silicon controlled rectifier (SCR), one or more TRIACs, or any other suitable device configured to control power delivery to the load (e.g., lighting fixture).

In some implementations, the power switch 120 can include a power metering circuit 220. The power metering circuit 220 can be configured to detect (e.g., measure) power consumption of one or more loads (e.g., luminaire) coupled to a power source (e.g., AC mains) via the one or more switching elements 210. It should be appreciated that the power metering circuit 220 can include any suitable electrical components. For instance, in some implementations, the power metering circuit 220 can include one or more voltage sensors and/or one or more current sensors.

Figure 3:
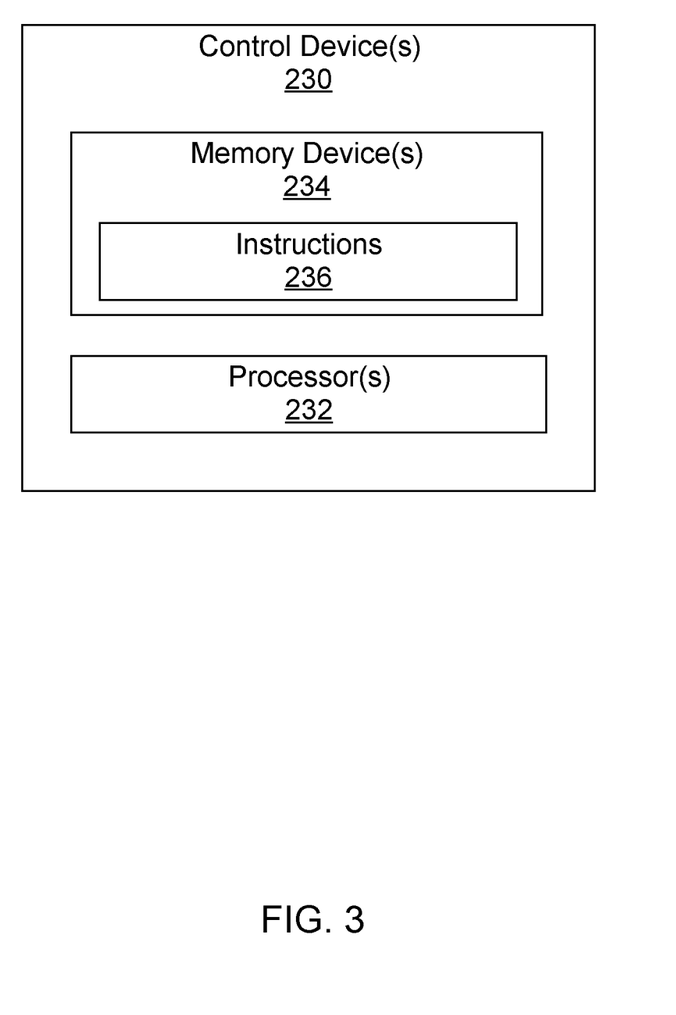
FIG. 3 depicts a block diagram of a control device according to example embodiments of the present disclosure.

In some implementations, the power switch 120 can include one or more control devices 230. FIG. 3 illustrates one embodiment of suitable components of the control device(s) 230. As shown, the control device(s) 230 can include one or more processors 232 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits.

As shown, the control device(s) 230 can include a memory device 234. Examples of the memory device 234 can include computer-readable media including, but not limited to, non-transitory computer-readable media, such as RAM, ROM, hard drives, flash drives, or other suitable memory devices. The memory device 234 can store information accessible by the processor(s) 232, including computer-readable instructions 236 that can be executed by the processor(s) 232. The computer-readable instructions 236 can be any set of instructions that, when executed by the processor(s) 232, cause the processor(s) 232 to perform operations. The computer-readable instructions 236 can be software written in any suitable programming language or can be implemented in hardware.

In some implementations, the computer-readable instructions 236 can be executed by the processor(s) 232 to perform operations, such as controlling power delivery to one or more loads. For instance, controlling power delivery to the one or more loads can include controlling operation of the one or more switching elements 210 to selectively couple the one or more loads to the power source (not shown).

In some implementations, the power switch 120 can include a communication circuit 240. The communication circuit 240 can include associated electronic circuitry that can be used to communicatively couple the control device(s) 230 with other devices, such as control device(s) associated with a user device (e.g., smartphone, tablet, laptop, etc.) or other power switches (e.g., slave power switch 126 of FIG. 1). In some implementations, the communication circuit 240 can allow the control device(s) 230 to communicate directly with the other devices. In other implementations, the communication circuit 240 can provide for communication with the other devices over a network.

The network can be any suitable type of network, such as a Power-Over-Ethernet (POE) network, a local area network (e.g., intranet), a wide area network (e.g., internet), a low power wireless network (e.g., Bluetooth Low Energy (BLE), Zigbee, etc.), or some combination thereof and can include any number of wired or wireless links. In general, communication over the network can be implemented via any type of wired or wireless connection, using a wide variety of communication protocols, encodings or formats, and/or protection schemes.

Example communication technologies used in accordance with example aspects of the present disclosure can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, Zigbee, Halow, cellular communication, LTE, low-power wide area networking, VSAT, Ethernet, MoCA (Multimedia over Coax Alliance), PLC (Power-line communication), DLT (digital line transmission), Power over Ethernet, etc. Other suitable wired and/or wireless communication technologies can be used without deviating from the scope of the present disclosure.

Referring briefly again to FIG. 2, the power switch 120 can include one or more input devices 250 communicatively coupled with the one or more control devices 230. In some implementations, the one or more input devices 250 can include, without limitation, a press-button, a rocker switch, a paddle switch, or a rocker switch. It should be appreciated, however, that the one or more input devices 250 can include any suitable type of input device. In some implementations, the one or more input devices 250 can be manipulated to selectively couple the electrical load (e.g., light source) to the power source. Alternatively or additionally, the electrical load can be a dimmable light source, and the one or more input devices 250 can be manipulated to dim or brighten the light source.

In some implementations, the power switch 120 can include one or more output devices 260 communicatively coupled with the one or more control devices 230. For instance, the one or more output devices 260 can include one or more speakers configured to emit audible noise. Alternatively or additionally, the one or more output devices 260 can include one or more indicator lights (e.g., LED indicator lights).

Figure 4:
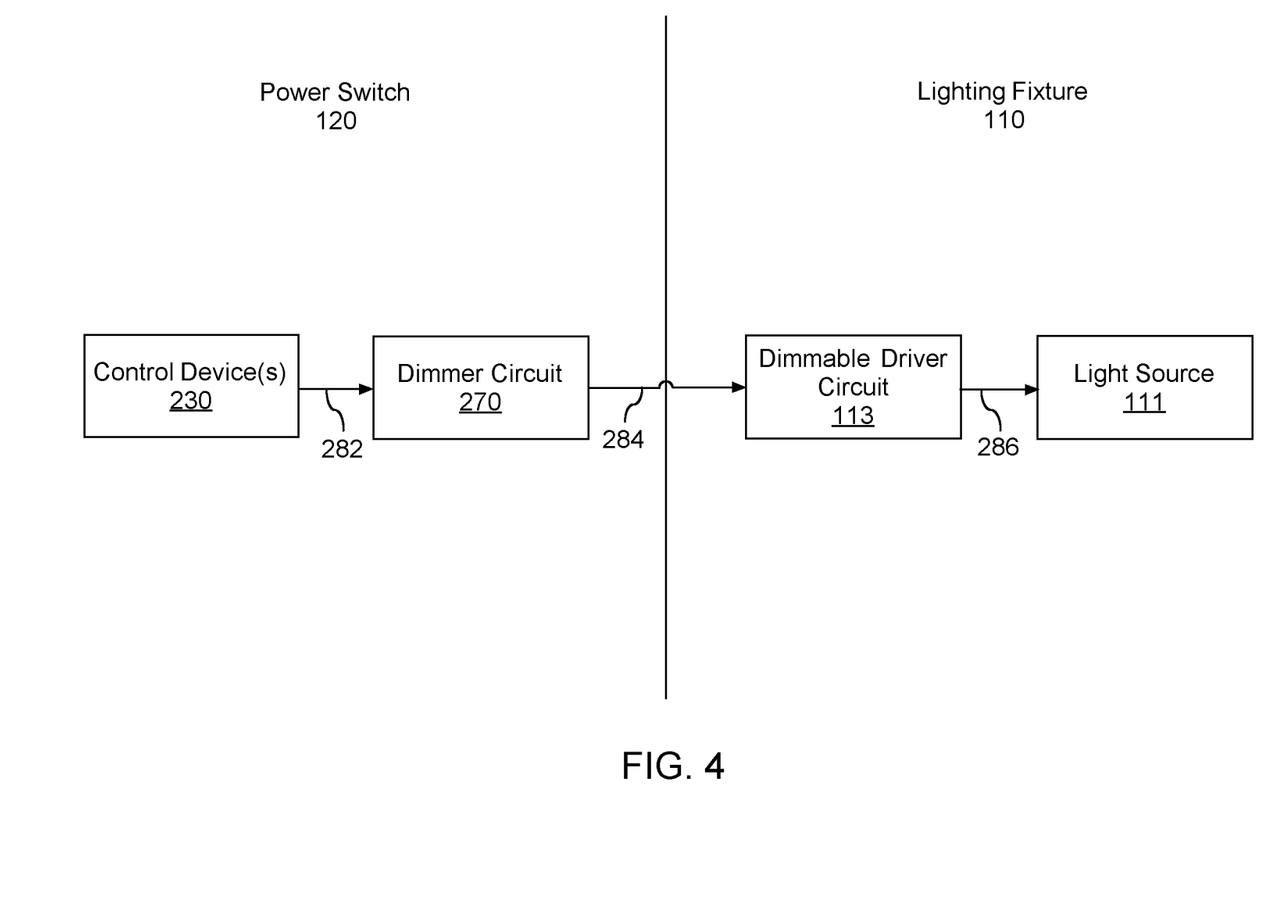
FIG. 4 depicts an example lighting fixture used in conjunction with a power switch according to example embodiments of the present disclosure.

In some implementations, the power switch 120 can include a dimmer circuit 270. Referring briefly now to FIG. 4, the dimmer circuit 270 can be communicatively coupled with the control device(s) 230 of the power switch 120. In some implementations, the dimmer circuit 270 can receive one or more control signals 282 from the control device(s) 230. The one or more control signals 282 can be associated with dimming or brightening a light source 111 of the lighting fixture 110. It should be appreciated that the light source 111 can include any suitable type of light source. For instance, in some implementations, the light source 111 can include a light emitting diode (LED) device.

The dimmer circuit 270 can be configured to output a dimming control signal 284 based, at least in part, on the one or more control signals 282. The dimming control signal 284 can be, for instance, a 0V to 10V signal. As used herein, a 0V to 10V dimming control signal can vary from, for instance, 1V to 9V, 1V to 10V, 2V to 8V, 2V to 9V, 2V, to 10V, 1V to 11V, or other suitable range between about 0V and about 10V. Other suitable protocols can be used for the dimming control signal 284. For instance, the dimming control signal 284 can be a digital addressable lighting interface (DALI) dimming control signal, digital multiplex (DMX) dimming control signal, or other dimming control signal.

As shown, the lighting fixture 110 can include a driver circuit 113. The driver circuit 113 can be configured to receive an input power, such as an input AC power or an input DC power, from a power source. The driver circuit 113 can be further configured to convert the input power to a suitable driver output 286 for powering a load, such as the light source 111 of the lighting fixture 110. In some embodiments, the driver circuit 113 can include various components, such as switching elements (e.g. transistors) that are controlled to provide the suitable driver output 286. For instance, in one embodiment, the driver circuit 113 can include one or more transistors. Gate timing commands can be provided to the one or more transistors to convert the input power to a suitable driver current using pulse width modulation techniques. In other instances, the driver circuit 113 can be a direct drive AC circuit with full bridge rectification wherein the driver output 286 is a constant Irms current.

In some implementations, the driver circuit 113 can be dimmable driver circuit. For instance, the driver circuit 113 can receive the dimming control signal 284 from the dimmer circuit 270 of the power switch 120. In this manner, the driver circuit 113 can control the driver output 286 based, at least in part, on the dimming control signal 284. For example, reducing the dimming control signal 284 by about 50 percent can result in a corresponding reduction in the driver output 286 of about 50 percent. The reduction of the driver output 286 for supply to the one or more lighting fixtures 110 (FIG. 1) can result in the radiant flux of one or more light sources 111 of the lighting fixtures 110 being decreased.

Figure 5:
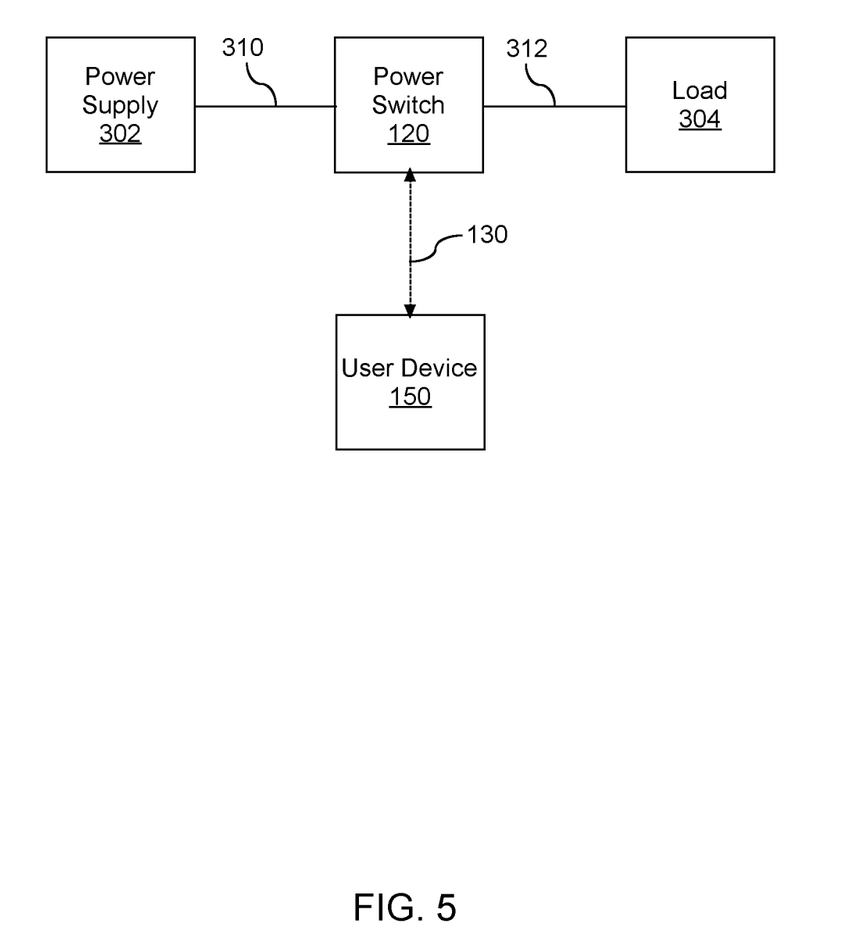
FIG. 5 depicts another schematic of the lighting system according to example embodiments of the present disclosure.

Referring now to FIG. 5, the power switch 120 can be coupled between a power source 302 (e.g., AC mains) and a load 304, such as the one or more lighting fixtures 110 discussed above with reference to FIG. 1. As shown, the power switch 120 can be coupled to the power source 302 via a first set of conductors 310 (e.g., wires). In some embodiments, an electrical panel, such as the electrical panel 122 discussed above with reference to FIG. 1, can be coupled between the power source 302 and the power switch 120. As shown, the power switch 120 can be coupled to the load 304 via a second set of conductors 312 (e.g., wires). In some implementations, the power metering circuit 220 (FIG. 2) of the power switch 120 can be coupled to the second set of conductors 312. In this manner, the power metering circuit 220 of the power switch 120 can detect (e.g., measure) power consumption of the load 304. For example, the power metering circuit 220 can be configured to detect a current flowing through the second set of conductors 312. Alternatively or additionally, the power metering circuit 220 can be configured to detect a voltage associated with the load 304. As will be discussed below in more detail, the one or more control devices 230 (FIG. 2) of the power switch 120 can be configured to control power delivery to the load 304 based, at least in part, on data obtained from the power metering circuit 220.

In some implementations, the one or more control devices 230 of the power switch 120 can be further configured to determine whether the power consumption of the load 304 exceeds (e.g., is greater than) a threshold associated with a power rating for the power switch 120 for an amount of time greater than a threshold period. In this manner, the one or more control devices 230 can be configured to ignore spikes in power consumption of the load 304 that exceed the threshold for a time less than the threshold period.

In some implementations, the one or more control devices 230 can dim one or more dimmable light sources 111 (FIG. 4) of the lighting fixture 110 (FIG. 4) when power consumption of the lighting fixture 110 exceeds the threshold for a time greater than the threshold period. For example, the one or more control devices 230 can provide one or more control signals 282 (FIG. 4) to the dimmer circuit 270 of the power switch 120. The dimmer circuit 270 can provide the dimming control signal 284 (FIG. 4) to the driver circuit 113 (FIG. 4) of the lighting fixture 110 based, at least in part, on the one more control signals 282. The driver circuit 113 can be configured to adjust the driver output 286 provided to the one or more light sources 111 of the lighting fixture 110 based, at least in part, on the dimming control signal 284. More specifically, the driver circuit 113 can adjust the driver output 286 to facilitate dimming of the one or more light sources 111. In this manner, power consumption of the lighting fixture 110 can be reduced. In some implementations, the one or more light sources 111 can be dimmed until data obtained from the power metering circuit 220 indicates power consumption of the lighting fixture 110 no longer exceeds the threshold for an amount of time greater than the threshold period.

In alternative implementations, the power switch 120 can be configured to control power delivery to a non-dimmable light source. For instance, the non-dimmable light source can be a light source that is not coupled to a dimmer circuit 270 (FIG. 4) or is otherwise not capable of dimming. When power consumption of the non-dimmable light source exceeds the threshold for a timer greater than the threshold period, the one or more control devices 230 can be configured to control operation of one or more switching elements 210 (FIG. 2) of the power switch 120 to decouple the non-dimmable light source from the power source 302. In this manner, the non-dimmable light source can no longer receive electrical power from the power source 302.

In some implementations, the one or more control device 230 can be configured to provide a notification indicative of power consumption of the load 304 exceeding the threshold for a time greater than the threshold period. For instance, the notification can include audible notification provided via one or more speakers of the power switch. Alternatively or additionally, the notification can include a visual notification provided via one or more indicator lights of the power switch. In some implementations, however, the notification can be provided over a network to one or more user device (e.g., smartphone, tablet, laptop, etc.). For instance, the notification can include a text, email, automated phone call, or any other suitable notification.

Figure 6:
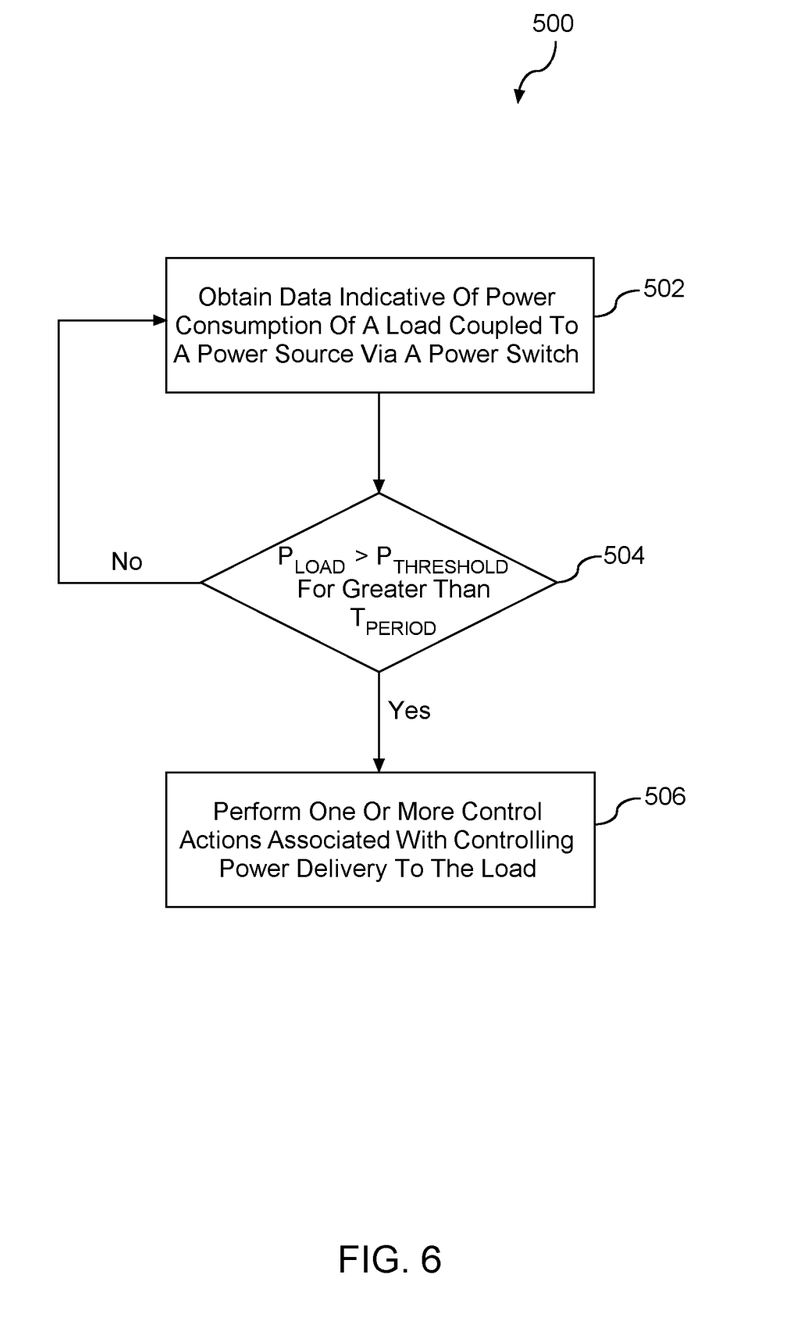
FIG. 6 depicts a flow diagram of a method for controlling power delivery to a load via a power switch according to example embodiments of the present disclosure.

Referring now to FIG. 6, a flow diagram of a method 500 for controlling power delivery to a load via a power switch is provided according to example embodiments of the present disclosure. It should be appreciated that the method 500 can be implemented using the power switch discussed above with reference to FIGS. 1-4. FIG. 6 depicts steps performed in a particular order for purposes of illustration and discussion. Those of ordinary skill in the art, using the disclosures provided herein, will understand that various steps of the method 500 may be adapted, modified, rearranged, performed simultaneously or modified in various ways without deviating from the scope of the present disclosure.

At (502), the method 500 includes obtaining, by one or more control devices of the power switch, data indicative of power consumption of a load coupled to a power source via the power switch. For instance, the one or more control devices can obtain the data from a power metering circuit of the power switch. In some implementations, the one or more control devices of the power switch can be configured to store the data obtained from the power metering circuit. For instances, the data can be stored in one or more memory devices of the one or more control devices. In this manner, the one or more control devices can generate a historical record of power consumption of the load.

At (504), the method 500 includes determining, by the one or more control devices, whether power consumption $P_{LOAD}$ of the load exceeds a threshold $P_{THRESHOLD}$ associated with a power rating for the power switch for an amount of time greater than a threshold period $T_{PERIOD}$. More specifically, the one or more control devices of the power can determine whether power consumption $P_{LOAD}$ of the load exceeds the threshold $P_{THRESHOLD}$ for greater than the threshold period $T_{PERIOD}$ based, at least in part, on the data obtained at (502). If the one or more control devices determine the power consumption $P_{LOAD}$ of the load exceeds the threshold $P_{THRESHOLD}$ for greater than the threshold period $T_{PERIOD}$, the method 500 proceeds to (506). Otherwise, the method 500 reverts to (502).

Figure 7:
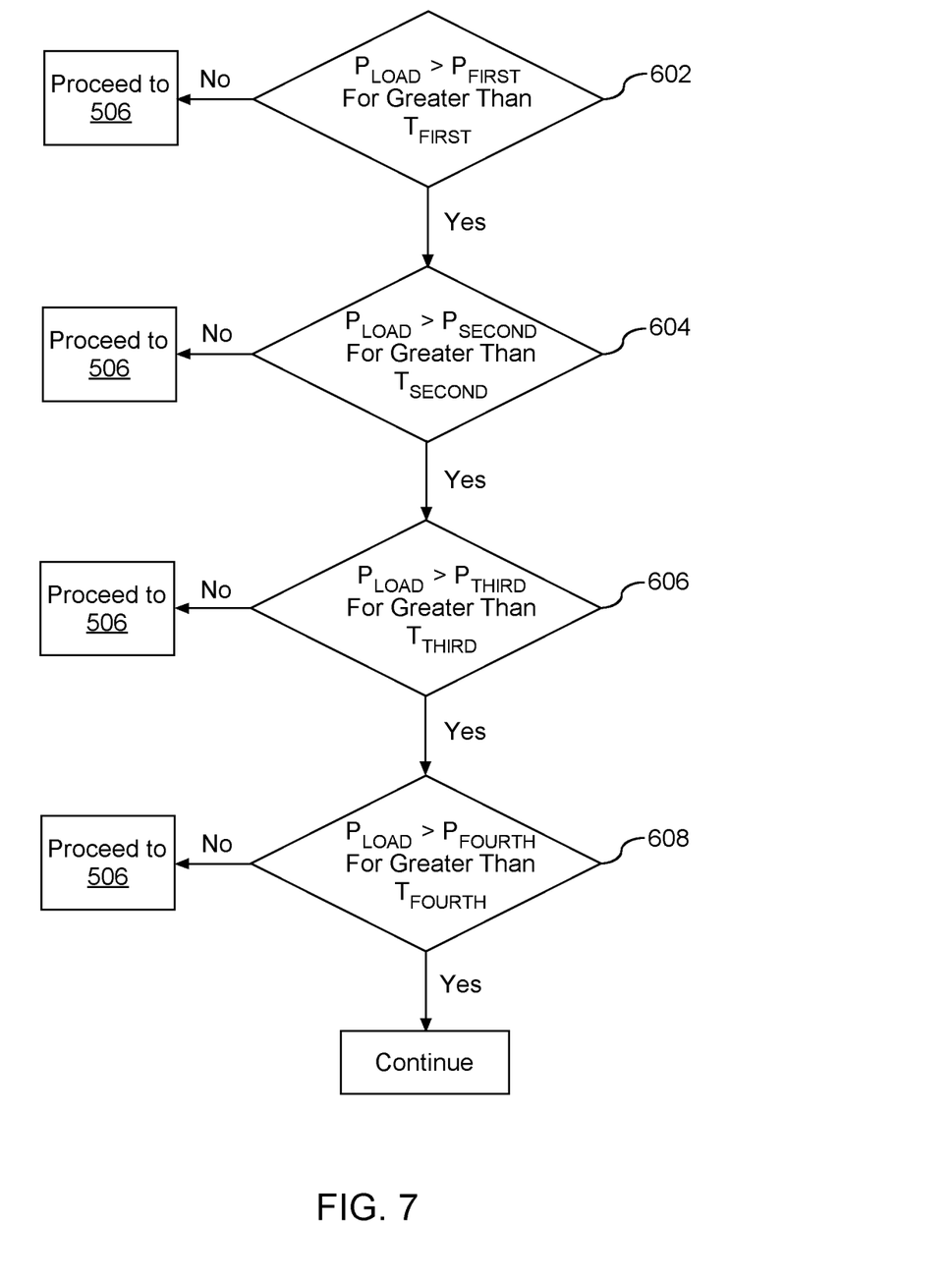
FIG. 7 depicts a flow diagram of a method for determining whether an electrical load has exceeded a threshold amount of power for a time greater than a threshold period according to example embodiments of the present disclosure.

Referring briefly now to FIG. 7, the one or more control devices can be configured to compare the power consumption $P_{LOAD}$ of the load against a plurality of thresholds and a plurality of threshold periods at (504). For instance, at (602), the one or more control devices can determine whether power consumption $P_{LOAD}$ of the load exceeds a first threshold $P_{FIRST}$ for greater than a first threshold period $T_{FIRST}$. In example embodiments, the first threshold $P_{FIRST}$ corresponds to about 80 percent of the power rating for the power switch. If the power consumption $P_{LOAD}$ of the load exceeds the first threshold $P_{FIRST}$ for greater than the first threshold period $T_{FIRST}$, the method 500 proceeds to (604). Otherwise, the method 500 reverts to (502).

At (604), the one or more control devices can determine whether power consumption $P_{LOAD}$ of the load exceeds a second threshold $P_{SECOND}$ for greater than a second threshold period $T_{SECOND}$. In example embodiments, the second threshold $P_{SECOND}$ corresponds to about 90 percent of the power rating for the power switch. Alternatively or additionally, a duration of the second threshold $T_{SECOND}$ can be less than a duration of the first threshold $T_{FIRST}$. If the power consumption $P_{LOAD}$ of the load exceeds the second threshold $P_{SECOND}$ for greater than the second threshold period $T_{SECOND}$, the method 500 proceeds to (606). Otherwise, the method 500 proceeds to (506).

At (606), the one or more control devices can determine whether power consumption $P_{LOAD}$ of the load exceeds a third threshold $P_{THIRD}$ for greater than a third threshold period $T_{THIRD}$. In example embodiments, the third threshold $P_{THIRD}$ corresponds to about 100 percent of the power rating for the power switch. Alternatively or additionally, a duration of the third threshold $T_{THIRD}$ can be less than the duration of the first threshold $T_{FIRST}$ and the duration of the second threshold $T_{SECOND}$. If the power consumption $P_{LOAD}$ of the load exceeds the third threshold $P_{THIRD}$ for greater than the third threshold period $T_{THIRD}$, the method 500 proceeds to (608). Otherwise, the method 500 proceeds to (506).

At (608), the one or more control devices can determine whether power consumption $P_{LOAD}$ of the load exceeds a fourth threshold $P_{FOURTH}$ for greater than a fourth threshold period $T_{FOURTH}$. In example embodiments, the fourth threshold $P_{FOURTH}$ corresponds to about 110 percent of the power rating for the power switch. Alternatively or additionally, a duration of the fourth threshold $T_{FOURTH}$ can be less than the duration of the first threshold $T_{FIRST}$, the duration of the second threshold $T_{SECOND}$, and the duration of the third threshold $T_{THIRD}$. If power consumption $P_{LOAD}$ of the load exceeds the fourth threshold $P_{THIRD}$ for greater than the third threshold period $T_{THIRD}$, the method 500 proceeds to (610). Otherwise, the method 500 proceeds to (506). At (610), the method 500 can include determining whether power consumption $P_{LOAD}$ of the load exceeds one or more additional thresholds and threshold periods. Alternatively, the method 500 can proceed to (506).

At (506), the method 500 includes performing, by the one or more control devices, one or more control actions associated with controlling power delivery to the load. In some implementations, the one or more control actions can include dimming one or more light sources of the lighting fixture. More specifically, the one or more control devices can provide one or more control signals to a dimmer circuit of the power switch. In this manner, the output (e.g., dimming control signal) of the power switch can be dimmed.

As discussed above, the load, in some implementations, can be a non-dimmable light source. In such implementations, the one or more control actions performed by the one or more control devices at (506) can include controlling operation of one or more switching elements of the power switch to decouple the non-dimmable light source from the power source. In this manner, the non-dimmable light source can no longer receive electrical power form the power source.

Alternatively or additionally, the one or more control actions performed by the one or more control devices at (506) can include providing a notification indicative of power consumption of the load exceeding the power rating of the power switch. For instance, the notification can include an audible notification provided via one or more speakers of the power switch. Alternatively or additionally, the notification can include a visual notification provided via one or more indicator lights of the power switch. In some implementations, however, the notification can be provided over a network to one or more user device (e.g., smartphone, tablet, laptop, etc.). More specifically, the notification can include a text, email, automated phone call, or any other suitable notification.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A power switch configured to control power delivery to a load, the power switch comprising:
   one or more switching elements configured to selectively couple the load to a power source;
   a power metering circuit;
   a communication circuit configured to provide communication between the power switch and at least one other device; and
   one or more control devices configured to perform operations, the operations comprising:
      obtaining, via the power metering circuit, data indicative of power consumption by the load;
      determining whether power consumption by the load exceeds a first threshold associated with a power rating for the power switch for a time greater than a first threshold period;
      determining whether power consumption by the load exceeds a second threshold associated with the power rating for the power switch for a time greater than a second threshold period when the power consumption by the load exceeds the first threshold for a time greater than the first threshold period; and
      performing one or more control actions associated with controlling power delivery to the load when the power consumption by the load exceeds the second threshold for a time greater than the second threshold period.

2. The power switch of claim 1, wherein the load comprises a lighting fixture.

3. The power switch of claim 2, wherein performing one or more control actions comprises dimming one or more light sources of the lighting fixture.

4. The power switch of claim 3, wherein dimming one or more light sources of the lighting fixture comprises providing one or more control signals to a dimmer circuit of the power switch, the one or more control signals associated with adjusting an output of the power switch to dim the one or more light sources.

5. The power switch of claim 1, wherein performing one or more control actions comprises providing a notification indicative of power consumption by the load being greater than the threshold for greater than the threshold period.

6. The power switch of claim 5, wherein the notification comprises at least one of an audible alert and a visual alert.

7. The power switch of claim 1, wherein the first threshold is associated with a first percentage of the power rating; and
   wherein the second threshold is associated with a second percentage of the power rating, the second percentage being greater than the first percentage.

8. The power switch of claim 1, wherein a duration of the second threshold period is shorter than a duration of the first threshold period.

9. The power switch of claim 5, wherein the notification is provided over a network to a user device.

10. The power switch of claim 1, wherein performing one or more control actions comprises controlling operation of the one or more switching elements to decouple the load from the power source.

11. The power switch of claim 1, wherein the load comprises a ceiling fan.

12. The power switch of claim 1, wherein the load comprises a non-dimmable light source.

13. The power switch of claim 12, wherein the one or more control actions comprise controlling operation of the one or more switching elements to decouple the non-dimmable light source from the power source.

14. The power switch of claim 1, wherein the power source comprises an alternating current (AC) power source.

15. A method for controlling power delivery to a load via a power switch, comprising:
   obtaining, by one or more control devices of a power switch, data indicative of power consumption of the load;
   determining, by the one or more control devices, whether power consumption by the load exceeds a first threshold associated with a power rating for the power switch for a first time greater than a threshold period;
   responsive to determining power consumption by the load exceeds the first threshold for a time greater than the first threshold period, determining, by the one or more control devices, whether power consumption by the load exceeds a second threshold associated with the power rating for the switch for a time greater than a second threshold period; and responsive to determining power consumption by the load exceeds the second threshold for a timer greater than the second threshold period, performing, by the one or more control devices, one or more control actions associated with controlling power delivery to the load.

16. The method of claim 15, wherein
the first threshold is associated with a first percentage of the power rating,
wherein the second threshold is associated with a second percentage of the power rating, the second percentage being greater than the first percentage, and
wherein a duration of the second threshold period is shorter than a duration of the first threshold period.

17. The method of claim 16, wherein the second percentage is greater than 100% of the power rating.

18. The method of claim 15, wherein the load comprises a lighting fixture.

19. The method of claim 18, wherein performing one or more control actions comprises dimming one or more light sources of the lighting fixture.

20. The method of claim 19, wherein dimming one or more light sources of the lighting fixture comprises providing one or more control signals to a dimmer circuit of the power switch, the one or more control signals associated with adjusting an output of the power switch to dim the one or more light sources.

* * * * *